United States Patent
Miranda et al.

(10) Patent No.: US 7,826,940 B2
(45) Date of Patent: Nov. 2, 2010

(54) METHOD FOR STARTING ON AN UP SLOPE OR WITH A HIGH LOAD

(75) Inventors: Paulo Miranda, Courbevoie (FR); Stephane Rimaux, Meudon (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 264 days.

(21) Appl. No.: 11/817,677

(22) PCT Filed: Feb. 24, 2006

(86) PCT No.: PCT/FR2006/050163

§ 371 (c)(1),
(2), (4) Date: Aug. 31, 2007

(87) PCT Pub. No.: WO2006/092523

PCT Pub. Date: Sep. 8, 2006

(65) Prior Publication Data

US 2008/0195267 A1 Aug. 14, 2008

(30) Foreign Application Priority Data

Mar. 1, 2005 (FR) .................................. 05 50545

(51) Int. Cl.
*G05D 3/00* (2006.01)
(52) U.S. Cl. ..................... 701/22; 180/65.1; 318/139; 903/903; 477/5; 477/7
(58) Field of Classification Search ............. 701/22; 477/5; 180/65.1; 318/139

See application file for complete search history.

(56) References Cited

U.S. PATENT DOCUMENTS

| 6,083,139 | A  | * | 7/2000 | Deguchi et al. ............... 477/5 |
| 6,175,785 | B1 | * | 1/2001 | Fujisawa et al. ............ 701/22 |
| 6,253,127 | B1 |   | 6/2001 | Itoyama et al. |
| 6,424,053 | B1 | * | 7/2002 | Wakashiro et al. ........ 290/40 C |

(Continued)

FOREIGN PATENT DOCUMENTS

DE  102006034935.51  *  7/2006

(Continued)

OTHER PUBLICATIONS

Design of an optimal clutch controller for commercial trucks; David, J.; Natarajan, N.; American Control Conference, 2005. Proceedings of the 2005; Digital Object Identifier: 10.1109/ACC.2005.1470196; Publication Year: 2005 , pp. 1599-1606 vol. 3.*

(Continued)

*Primary Examiner*—Cuong H Nguyen
(74) *Attorney, Agent, or Firm*—Nicolas E. Seckel (57) ABSTRACT

The invention essentially concerns a method for fast starting on an up slope or with a high load. Said method uses a power transmission device (1.1) comprising a traction chain. Said traction chain consists in particular of a heat engine (2), a clutch (3), an electrical macine (4), and wheels (6). The invention is characterized in that while the vehicle is stopped or is running at low speed up a slope, the heat engine (2) is stopped, and when the vehicle is accelerated, the heat engine (2) is started using a starting system (7) mechanically independent of the electrical machine.

8 Claims, 5 Drawing Sheets

U.S. PATENT DOCUMENTS

| | | | |
|---|---|---|---|
| 6,425,838 B1* | 7/2002 | Matsubara et al. | 475/5 |
| 6,487,998 B1* | 12/2002 | Masberg et al. | 123/192.1 |
| 6,494,809 B1 | 12/2002 | Suzuki et al. | |
| 6,609,992 B2* | 8/2003 | Kusumoto et al. | 475/318 |
| 6,878,094 B2* | 4/2005 | Kitamura et al. | 477/5 |
| 6,934,610 B2* | 8/2005 | Wakashiro et al. | 701/22 |
| 6,949,041 B2* | 9/2005 | Fujioka et al. | 475/5 |
| 6,998,727 B2* | 2/2006 | Gray, Jr. | 290/40 C |
| 7,004,136 B2* | 2/2006 | Garabello et al. | 123/179.28 |
| 7,023,102 B2* | 4/2006 | Itoh | 290/40 C |
| 7,128,690 B2* | 10/2006 | Inoue et al. | 477/175 |
| 7,308,841 B2* | 12/2007 | Vauthier | 74/665 B |
| 7,326,140 B2* | 2/2008 | Kim et al. | 475/5 |
| 7,448,972 B2* | 11/2008 | Garabello et al. | 474/74 |
| 7,456,509 B2* | 11/2008 | Gray, Jr. | 290/40 C |
| 7,469,778 B2* | 12/2008 | Groddeck et al. | 192/48.3 |
| 7,727,115 B2* | 6/2010 | Serkh | 477/115 |
| 2001/0023790 A1 | 9/2001 | Hasegawa | |
| 2002/0050259 A1 | 5/2002 | Kojima | |
| 2002/0117860 A1* | 8/2002 | Man et al. | 290/46 |
| 2003/0104900 A1* | 6/2003 | Takahashi et al. | 477/3 |
| 2003/0224903 A1* | 12/2003 | Kitamura et al. | 477/5 |

FOREIGN PATENT DOCUMENTS

| | | | |
|---|---|---|---|
| EP | 0965475 A | | 12/1999 |
| EP | 1201479 A | | 5/2002 |
| JP | 2001023311 | * | 1/2000 |
| JP | 2004-106506 | * | 3/2004 |
| WO | PCT/DE04/01269 | * | 5/2006 |

OTHER PUBLICATIONS

Nonlinear-Control Strategy for Advanced Vehicle Thermal-Management Systems; Salah, M.H.; Mitchell, T.H.; Wagner, J.R.; Dawson, D.M.; Vehicular Technology, IEEE Transactions on, vol. 57, Issue: 1, Digital Object Identifier: 10.1109/TVT.2007.901892 ; Publication Year: 2008 , pp. 127-137.*

M. Salah, "Nonlinear control strategies for advanced vehicle thermal management strategies," Ph.D. dissertation, Dept. Elect. Eng., Clemson Univ., Clemson, SC, Aug. 2007; cited by other.*

M. Salah, J. Wagner, and D. Dawson. (Oct. 2006). "Adaptive and robust tracking control for thermal management systems," Clemson Univ., Clemson, SC, CRB Tech. Rep. CU/CRB/10/2/06/#1. [Online]. Available: http://www.ces.clemson.edu/ece/crb/publictn/tr.htm; cited by other.*

Development of thermomagnetic engine for exhaust heat recovery; Takahashi, Y. et al.; Magnetics Conference, 2003; INTERMAG 2003. IEEE International; Digital Object Identifier: 10.1109/INTMAG. 2003.1230545; Publication Year: 2003 , pp. EA-12.*

The device of regulation of key parameters of lamination: Speeds of rotating and temperatures; Komissarov, V.G.et al.; Electron Devices and Materials, 2008. EDM 2008. 9th International Workshop and Tutorials on; Digital Object Identifier: 10.1109/SIBEDM.2008. 4585859; Publication Year: 2008 , pp. 99-10.*

International Search Report mailed Aug. 4, 2006 in PCT/FR2006/050163.

* cited by examiner

STATE OF THE ART

STATE OF THE ART

METHOD FOR STARTING ON AN UP SLOPE OR WITH A HIGH LOAD

The present invention concerns a method for fast setting in motion of a vehicle on an up slope or with a high load. An objective of the invention is to optimize an acceleration of the vehicle during initiation of movement on an up slope or with a high load, while ensuring in particular a continuity of the torque applied to the wheels. A particularly advantageous application of the invention is found in the field of motor vehicle, but it could also be implemented in any type of hybrid drive land vehicle.

In the present text, the term "start" is used to designate the initiation of the rotation of the heat engine crankshaft. The term "setting in motion" is used to designate the initial movement of the vehicle from a zero speed to a non-zero speed. The term "setting in motion" is also used when the vehicle moves at low speed and a significant force other than that linked to its inertia is provided to this vehicle. In other words, a vehicle is set in motion when it is given an impulsion other than by its own inertia. The term "powered on" is used for the electrical machine when it is turned on.

So-called hybrid vehicles are known that combine the use of heat energy and of electrical energy to power their drive. This combination of energies is done in such a way as to optimize the fuel efficiency of such vehicles. This optimization of the fuel efficiency makes it possible for the hybrid vehicles to pollute fare less and use far less fuel than vehicles operating solely on heat energy and whose efficiency is not optimized. Several types of hybrid vehicles power transmission devices are known.

Firstly, hybrid transmission devices are known that have an engine and two electrical machines. The wheel shaft, the shaft of the heat engine and the shafts of the two electrical machines are connected to one another through a mechanical assembly. This mechanical assembly can be made up of two planetary gearsets. Such a transmission device is described in the French application FR-A-2832357.

Hybrid transmission devices having a heat engine and a single electrical machine are also known. A shaft of this heat engine and a shaft of this electrical machine are connected to one another through a clutch. Such a device is operable in two different modes. In a first mode, called "electrical mode," the electrical machine alone powers the drive of the vehicle. In a second mode, called "hybrid mode," the electrical machine and the heat engine together power the drive of the vehicle.

In the hybrid mode, the power supplied by the electrical machine makes it possible to adjust the torque applied to the wheel shaft while also adjusting the torque and the speed of the heat engine to an operating point at which fuel consumption is optimized.

To this effect, each member of the transmission device: heat engine, clutch, electrical machine, and speed control unit, is controlled by a local control device, which is in turn commanded by a specific computer called "supervising computer." This computer can be independent or integrated into another computer such as the engine computer. This supervising computer executes programs to synchronize in particular the actions of the various elements of the transmission device with one another. This synchronization is carried out in such a way as to best fulfill a driver's request for acceleration.

More precisely, depending on the acceleration desired by the user and vehicle driving conditions, the supervising computer controls the various members of the device, selects the operating mode, coordinates the transitional phases of the various members, and chooses operating points for the engine and the electrical machine. The term "driving conditions" includes vehicle parameters as well as external parameters that can influence the operation of the vehicle. For example, the speed and acceleration of the vehicle are vehicle parameters, whereas the slope of a hill on which the vehicle is traveling and the ambient temperature are external parameters.

Figure 1:
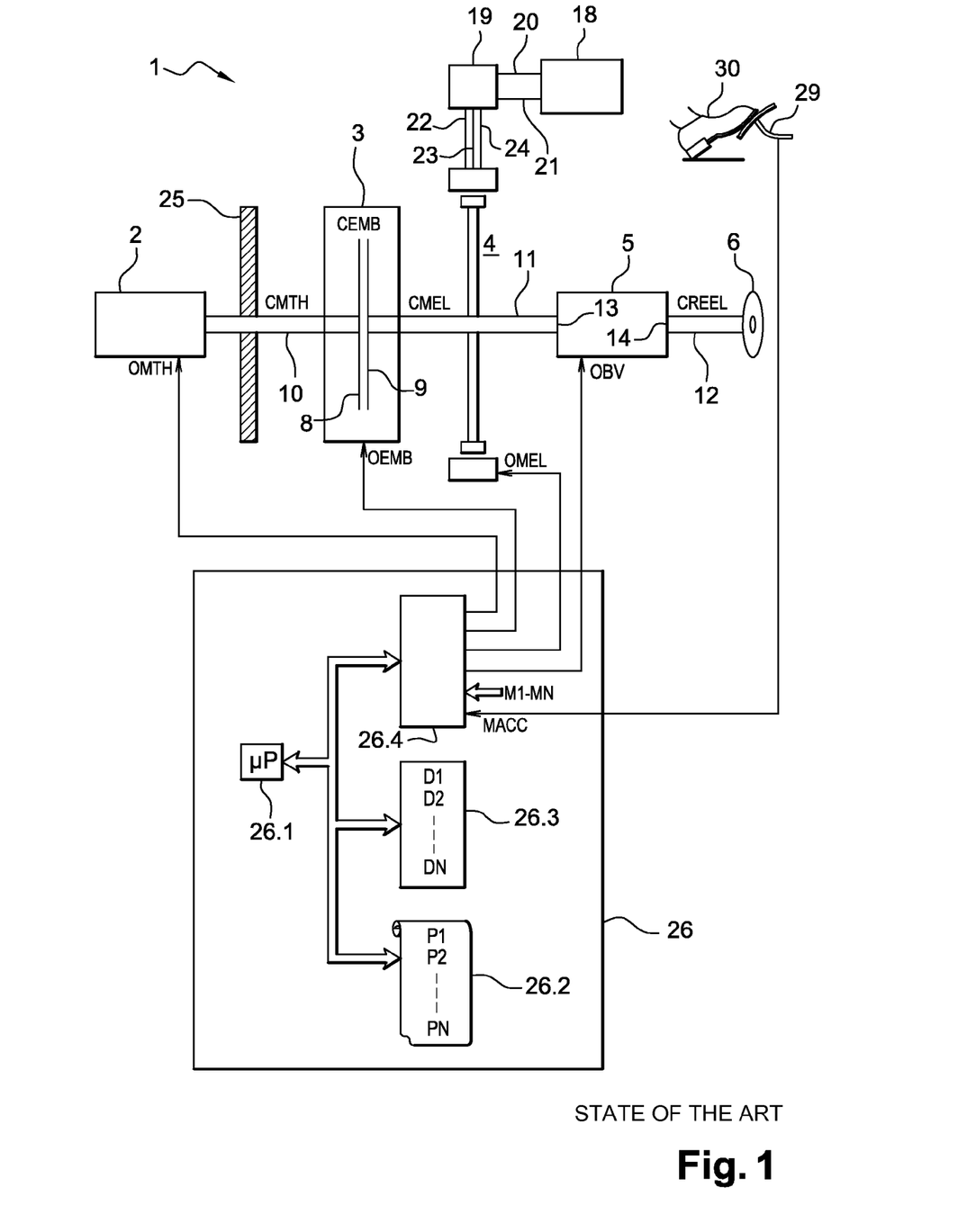
FIG. 1 (already described): a schematic representation of a state of the art power transmission device.

FIG. 1 shows a schematic representation of a transmission device 1 according to state of the art. This transmission device 1 has a heat engine 2, a clutch 3, an electrical machine 4, a speed control unit 5 such as a gearbox or a speed controller, and wheels 6, which make up a traction drive.

More precisely, the clutch 3 has a first clutch plate 8 and a second clutch plate 9. The first clutch plate 8 is connected to a shaft 10 of the heat engine 2. And the second clutch plate 9 is connected to a shaft 11 of the electrical machine 4. Additionally, the shaft 11 of the electrical machine 4 and a shaft 12 of the wheels 6 are respectively connected to an input 13 and an output 14 of the speed control unit 5.

As previously mentioned, the transmission device 1 is operable in two different modes. In electrical mode, the shaft 12 of the wheels 6 is driven by the electrical machine 4 alone. The clutch 3 is then released, so that the shaft 10 of the engine 2 and the shaft 11 of the electrical machine 4 are not coupled to one another. In this electrical mode, the electrical machine 4 generally operates as an engine. In a particular embodiment, then, the machine 4 draws energy from a storage system 18 such as a battery, notably through an inverter 19. The battery 18 delivers a DC voltage signal. In electrical mode, the inverter 19 thus transforms the DC voltage signal detectable between the battery terminals 20 and 21 into AC voltage signals, which are applied to phases 22-24 of the electrical machine 4.

In hybrid mode, the shaft 12 of the wheels 6 is driven by the heat engine 2 and the electrical machine 4. The clutch 3 is then engaged, so that the shaft 10 of the engine 2 and the shaft 11 of the wheels 6 are coupled to one another. The electrical machine 4 generally acts as an engine or as a generator and transmits power to the shaft 12 of the wheels 6 in order to adjust the torque detectable on the shaft 12 of the wheels 6 to the setpoint torque. In the same manner as that explained previously, the machine 4 transfers energy with the battery 18.

In electrical mode and hybrid mode, during battery recharge phases that coincide with a deceleration of the vehicle, the electrical machine 4 acts as a generator. During these recharge phases, the electrical machine 4 supplies energy to the battery 18. The inverter 19 then transforms the AC voltage signals detectable on phases 22-24 of the electrical machine 4 into a DC voltage signal that is applied to the terminals 20 and 21 of the battery 18.

In practice, the electrical machine 4 is a three-phase synchronous machine. An advantage of machines of this type is that they feature a compact design and good output.

In a particular embodiment, the transmission device 1 has a flywheel 25.

In addition, the state of the art transmission device 1 has a supervising computer 26 in this case. This supervising computer 26 has a microprocessor 26.1, a program memory 26.2, a data memory 26.3, and an input-output interface 26.4, connected to one another via a communication bus 31.

The data memory 26.3 contains data D1-DN, which correspond to the characteristics of the various members of the transmission device 1, namely, the heat engine 2, the clutch 3, the electrical machine 4 and the speed control unit 5. Some of the data D1-DN, for example, correspond to the response times of these members 2-5. Other data D1-DN, for example, correspond to maximum and minimum torques that can be applied to shafts associated with the members 2-5.

The input-output interface 26.4 receives signals M1-MN detectable at sensor outputs (not shown). These sensors make it possible to detect the vehicle driving conditions. For example, acceleration and speed sensors make it possible to know the acceleration and the speed of the vehicle, respectively, at any given moment. A humidity sensor can tell whether the vehicle is on a wet road or not. In addition, the interface 26.4 receives a MACC signal corresponding to a torque on the wheel as requested by a driver. That is, when he wants to accelerate, the driver presses on a pedal 29 with his foot 30. The resulting MACC signal is a function of how far down this pedal 29 is pushed.

According to the data D1-DN, the driving conditions, and the acceleration requested by the driver, the microprocessor 26.1 executes one of the programs P1-PN that initiates the operation of the transmission device 1 in a particular mode, and the adjustment of the torque detectable on the shaft 12 of the wheels 6. More precisely, when one of the programs P1-PN is executed, the microprocessor 26.1 commands the interface 26.4 in such a way that OMTH, OEMB, OMEL and OBV signals are sent to the heat engine 2, the clutch 3, the electrical machine 4, and the speed control unit 5, respectively, in order to control them. When there is a change in operating mode, some of the programs P1-PN generate OMTH, OEMB, OMEL and OBV signals that direct the transition from one mode to another.

In addition, the members 2-5 of the transmission device 1 each have an internal control system that is not shown. These control systems make it possible to regulate the values of torques detectable on shafts associated with these members 2-5.

In one example, with the driver requesting a slight acceleration, the supervising computer 26 commands the various members 2-5 so as to make the transmission device 1 operate in electrical mode. The torque applied to the shaft 12 of the wheels 6 is then generally equal to the torque detectable on the shaft 11 of the electrical machine 4, adjusted by a gear ratio. In contrast, with a request for a strong acceleration, the supervising computer 26 commands the various members 2-5 so as to make the transmission device 1 operate in hybrid mode. The torque applied to the shaft 12 of the wheels 6 is then equal to the torque detectable on the shaft 11 of the electrical machine 4, which is then equal to the sum of the torques detectable on the shaft 10 of the heat engine 2 and on the shaft of the machine 4.

Figure 2:
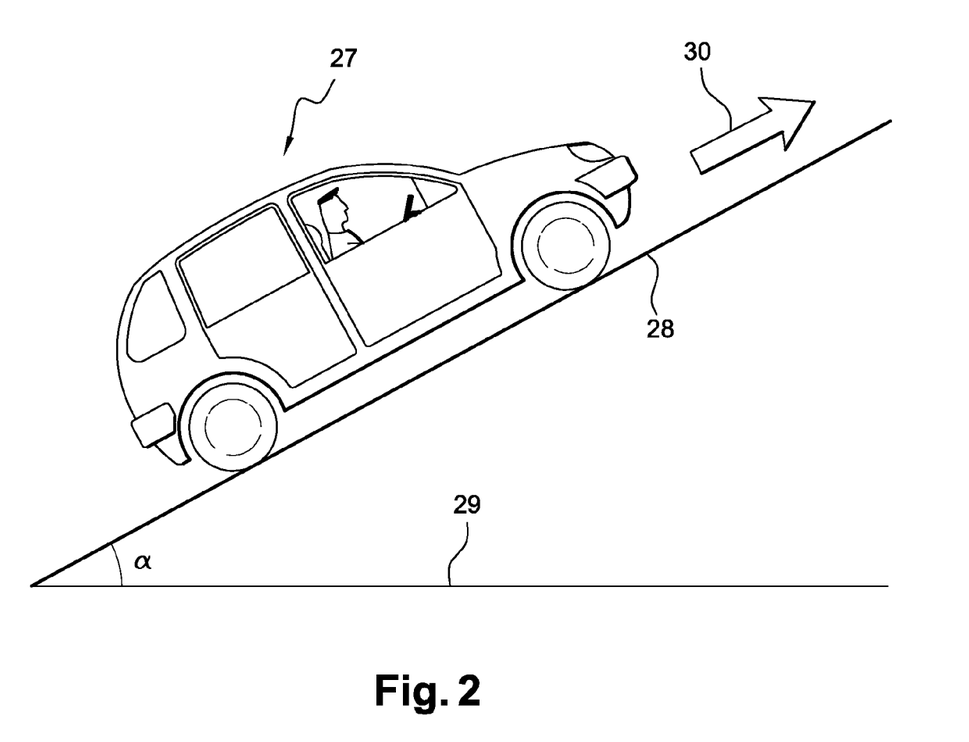
FIG. 2 (already described): a schematic view of a vehicle on an up slope.

In another example, an acceleration is requested when the vehicle is stopped on an up slope. FIG. 2 shows conditions for which it is considered that the initiation of movement of a vehicle 27 is performed on an up slope. More precisely, in FIG. 2, the vehicle 27 is on a road 28 that forms an angle α with a horizontal plane 29. The road 28 has a slope if the vehicle 27 that is on it has a tendency to move when it has been stopped and its hand brake has not been actuated.

In the rest of the document, it is considered that the vehicle is set in motion on the road 28, in an upward direction in the direction of the slope according to arrow 30. As a variant, it is considered that the acceleration requests are made while the vehicle 27 moves at low speed on the road 28, for example, at a speed lower than 15 km/h. Further, the initiation of movement of a loaded vehicle on a horizontal road can be similar to an initiation of movement on an up slope. Indeed, there is a correlation between the mass of the vehicle and the angle α. In this correlation, the heavier the mass of the vehicle, the higher the angle α.

In all the situations listed above, it is important for the acceleration of the vehicle 27 to be able to be dosed, and for the vehicle to reach as soon as possible the acceleration requested by the driver. For the acceleration to be able to be dosed, the course of the acceleration pedal 29 must always have an effect on the longitudinal dynamics of the vehicle 27. Thus, when the acceleration pedal 29 is pushed down by a given angle, generally the same acceleration must always be generated, regardless of the driving conditions of the vehicle 27 and of its operating mode. Further, the time required by the transmission device 1 to reach the requested acceleration must be acceptable, regardless of the driving conditions of the vehicle 27 and of its operating mode. For this time to be acceptable, the time for making the torque of the heat engine 2 available must be short and the torque of the electrical machine 4 must be kept at its best level possible. That is, the electrical machine 4 cannot usually ensure by itself an acceleration request from the driver. Thus, it is necessary to be able to use as soon as possible the torque of the heat engine 2 to increase the acceleration of the vehicle 27.

Figure 3:
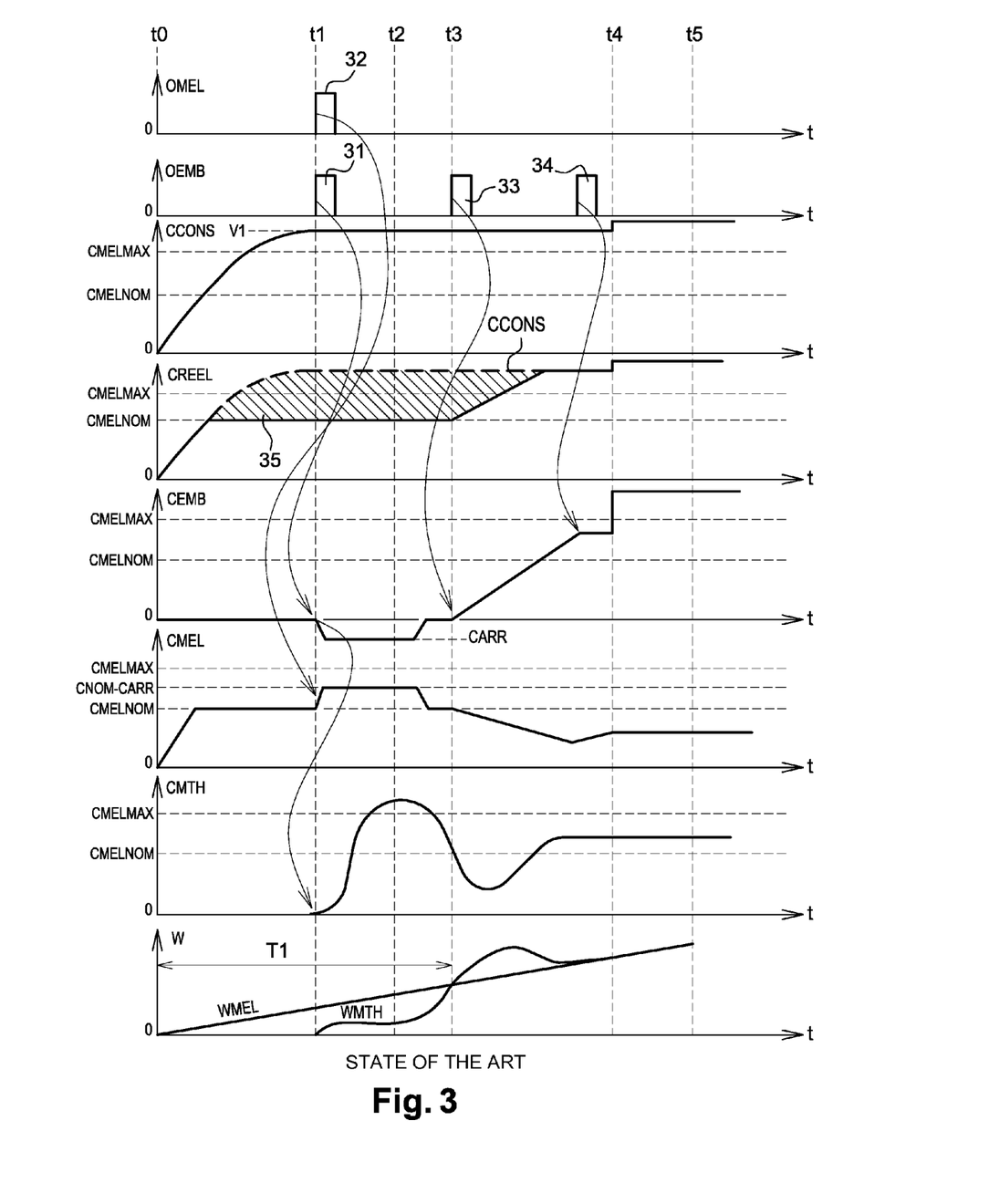
FIG. 3 (already described): timing diagrams representing the change over time in signals detectable on members of a state of the art transmission device during an initiation of movement on an up slope.

FIG. 3 shows timing diagrams of signals detectable on the various members 2-5 of the state of the art transmission device 1. These signals are detectable when an acceleration request is made in the upward direction of a slope, when the vehicle is stopped or moves at low speed.

More precisely, FIG. 3 shows the torque signals CEMB, CMEL and CMTH, which correspond to the torques detectable on the clutch 3, the shaft 11 of the electrical machine 4, and the shaft 10 of the heat engine 2, respectively.

FIG. 3 also shows the change over time in torque signals CCONS and CREEL, corresponding respectively to the setpoint torque to apply to the shaft 12 of the wheels 6 and the actual torque detectable on this shaft 12. The torque setpoint signal CCONS is established from the MACC signal and the M1-MN signals coming from the sensors.

The OEMB and OMEL signals are sent from the computer 26 to the clutch 3 and the electrical machine 4 to command them. For greater simplicity, the OMTH and OBV signals, which control the heat engine 2 and the speed control unit 5, respectively, are not shown.

Further, FIG. 3 shows on a same timing diagram the change over time in the rotation speed WMEL of the electrical machine 4, and the rotation speed WMTH of the heat engine 2.

At instant t0, the vehicle is stopped. The electrical machine 4 and the heat engine 2 each have a zero rotation speed. At instant t0, the driver requests an acceleration with his foot and sets the vehicle in motion while it is on a slope.

Between instants t0 and t1, the transmission device 1 enters a first acceleration phase. In this first phase, the setpoint torque CCONS increases exponentially, in correspondence in particular with the acceleration request from the driver. The setpoint torque CCONS increases to the point where at instant t1, it has already reached a value V1 greater than the peak torque CMELMAX of the electrical machine 4. Moreover, between instants t0 and t1, the electrical machine 4 a torque CMEL increases to level off at the nominal torque CMEL-NOM of this electrical machine 4. The rotation speed WMEL of the electrical machine 4 increases linearly, but it is not sufficient to start the heat engine 2. The heat engine 2 is off and its shaft 10 is not coupled with the shaft 11 of the electrical machine 4. The heat engine 2 thus has both a zero torque CMTH and a zero rotation speed WMTH. Since the heat engine 2 is off, the torque CREEL measured on the shaft 12 of the wheels 6 is equal to the torque CMEL of the electrical machine 4. The torque CREEL measured on the shaft 12 is thus lower than the expected setpoint torque CCONS. There is no torque detectable on the clutch 3.

Between instants t1 and t2, the transmission device 1 enters a second acceleration phase. In this second phase, as in the first, the electrical machine 4 alone powers the drive of the vehicle. An objective of this second phase is to start the heat engine 2. More precisely, in this second phase, the setpoint torque CCONS is always V1 which is greater than CMEL-MAX. At instant t1, the electrical machine 4 has a rotation speed WMEL sufficient to participate in starting the heat engine 2. A first signal 31 is then sent from the supervising computer 26 to the clutch 3. This signal 31 commands this clutch 3 in such a way that this clutch 3 transmits a breakaway torque CARR to the heat engine 2 to set it in rotation. This breakaway torque CARR is taken away from the traction drive. Because of this, a second signal 32 is sent by the computer 26 at the same time as the signal 31, to the electrical machine 4. This signal 32 commands the electrical machine 4 so that its torque CMEL offsets the breakaway torque CARR taken by the clutch 3. So in this first transitional phase, the clutch torque signal CEMB decreases and reaches a negative value equal to the breakaway torque value CARR. During this time, the electrical machine 4 torque signal CMEL increases by a value –CARR that is the negative of the breakaway torque value CARR. A heat engine 2 torque signal CMTH is then detectable, corresponding to the starting torque of this heat engine 2. The heat engine 2 then has a rotation speed WMTH that is increasing, but remains lower than the rotation speed WMEL of the electrical machine 4. The heat engine 2 is still not transmitting its torque to the shaft 12 of wheels 6. The torque CREEL measured on the shaft 12 is therefore still lower than the setpoint torque CCONS expected on this shaft 12. A purpose of the first transitional phase is to run the heat engine 2 through its first compression strokes. After having completed its first rotations, the heat engine 2 is operating at a high enough speed WMTH to be autonomous.

Between instants t2 and t3, the transmission device 1 enters a third acceleration phase. In this third phase, the speed of the heat engine increases, so that the plates 8 and 9 can then start sliding with respect to one another. More precisely, in this third phase, the setpoint torque CCONS still has the value V1. The electrical machine 4 torque signal CMEL decreases from a value CNOM-CARR to the nominal torque value CMEL-NOM of the electrical machine 4. And the clutch 3 torque signal CEMB returns to zero. The breakaway torque transmission phase thus ends between t2 and t3. Since the shaft 10 of the heat engine 2 is still not coupled with the shaft 11 of the electrical machine 4, the torque CREEL is still equal to the torque CMEL of the electrical machine 4. The torque CREEL thus remains much lower than the setpoint torque CCONS. The rotation speed WMEL of the shaft 11 of the electrical machine 4 increases linearly. And the rotation speed WMTH of the shaft 10 of the heat engine 2 increases to the point where it is higher than the rotation speed WMEL of the electrical machine 4 at instant t3. This rotation speed WMEL corresponds to the rotation speed of the wheel shaft, adjusted by a gear ratio.

Between instants t3 and t4, the transmission device 1 enters a fourth acceleration phase. In this fourth phase, the heat engine 2 first comes into synchronization, then the clutch 3 is engaged. More precisely, first, at instant t3, as soon as the rotation speed WMTH of the heat engine 2 becomes greater than the rotation speed of the electrical machine 4, a signal 33 is sent by the supervising computer 26 to the clutch 3. This signal 33 commands the clutch plates 8 and 9 to begin sliding relative to one another. The heat engine 2 then transmits a part of its torque CMTH to the shaft 12 of the wheels 6 via the clutch 3. The torque signal CEMB detectable on the clutch 3 then increases with a calibratable profile, whereas the torque signal CMEL of the electrical machine 4 decreases. Thus, the torque CREEL also increases. Further, during the synchronization of the heat engine 2, the rotation speed WMTH of the heat engine 2 converges toward that of the electrical machine 4. When these two speeds are equal, a signal 34 is sent to the clutch 3 by the supervising computer 26. This signal 34 commands the closing of this clutch 3. The rotation speeds of the engine WMTH and the machine WMEL then become identical. The torque signal CREEL reaches the value of the setpoint torque CCONS which is always equal to V1, generally, at the time the clutch 3 engages.

Between instants t4 and t5, the transmission device 1 enters a fifth acceleration phase. In this fifth phase, the driving members 2 and 4 of the device 1 converge toward their optimal setpoint torque signals, if they have not yet reached them.

On the timing diagram where the torque signal CREEL measured on the shaft 12 is shown, the setpoint torque signal CCONS has also been shown in dashed lines. The shaded area 35 corresponds to a so-called "non-dosability zone" where the driver will not be able to obtain the desired acceleration. In other words, in the non-dosability zone 35, there is an acceleration deficiency and the driver cannot control the torque applied to the shaft 12 of the wheels 6. The zone 35 depends on the maximal torque at which the electrical machine 4 can be used and the time T1 for making the heat engine 2 available.

Here, the zone 35 is particularly large because there is a large difference between the setpoint torque CCONS and the torque CREEL detectable on the shaft 12 of the wheels 6. That is, between instants t0 and t4, the electrical machine 4 cannot function at its peak torque CMELMAX. This is because the electrical machine 4 must maintain a reserve torque to make it possible to compensate the breakaway torque CARR withdrawn by the clutch 3, regardless of its speed. In other words, the electrical machine 4 must always operate at its nominal torque CMELNOM at most (or sometimes at a torque even lower), so as to be able to operate at any time with a higher torque that makes it possible to compensate the breakaway torque CARR.

In addition, the non-dosability zone 35 is here particularly long because the time period T1 for making the heat engine 2 available is long. This time period T1 is long because the electrical machine 4 must have a speed WMEL sufficient to participate in starting the heat engine 2. That is, it is impossible to start the heat engine 2 when the electrical machine 4 is stopped or when a gear is engaged.

Given that the non-dosability zone 35 is very large, it is difficult to implement such a method while ensuring the security of the driver. That is, with such a method, the vehicle has a very long response time, in the order of a second, as compared to the instant when the acceleration request has been made by the driver. This is the reason why, in general, when the vehicle is on a slope, the heat engine 2 is not stopped. To this effect, the power transmission device 1 has sensors, such as an accelerometer and/or an inclinometer, making it possible to detect whether the vehicle is on a slope or not. In addition, the vehicle can have load sensors to measure the weight of the vehicle and detect whether it is overloaded or not. The known hybrid vehicle thus loses its interest as soon as it is driven on a slope or with a high load, since in this situation, the heat engine 2, which consumes a lot of energy, is never stopped.

Further, in such a method of setting the vehicle in motion, it is very difficult to implement the management of the drives of the clutch 3 and of the electrical machine 4. These difficulties are due mainly to the high sensitivity of the members 2-5. That is, from one temperature to another, these members 2-5 do not have the same response times. Further, from one temperature to another, torques detectable on shafts associated with these members 2-5 vary.

Thus, it is difficult to time the withdrawal of the breakaway torque CARR on the clutch 3 so that it coincides perfectly with the application of the compensation torque CNOM-CARR by the electrical machine 4. This synchronization of torque withdrawals is necessary in order to guarantee that there is no torque discontinuity when the heat engine 2 starts. It is also difficult to apply a compensation torque exactly equal to the torque withdrawn by the clutch 3. That is, it is difficult to estimate the torque to apply to the clutch 3 while the breakaway torque CARR is being transmitted.

Thus, the invention proposes to reduce the non-dosability zone during a critical initiation of movement on an up slope or with a high load, by resolving in particular the problem of the time for making the heat engine available.

To this end, in the invention, the known architecture of the transmission device is supplemented with a starting system that is independent of the electrical machine. In the invention, it is no longer the clutch, but the starting system that sends the heat engine its breakaway torque in order to make it start. In this way, this starting system makes it possible to disassociate the problems of starting the engine from those of the vehicle traction drive.

According to the invention, in order to set a vehicle in motion on an up slope or to produce a high acceleration when it operates at low speed, the heat engine is started using the starting system as soon as an acceleration request has been made. Thus, as soon as an acceleration request has been made, the torque available on the wheel shaft is equal to the sum of the torque detectable on the shaft of the heat engine and of the torque detectable on the shaft of the machine. Even though the vehicle is on a slope, an acceleration of the vehicle can then be obtained very quickly. Thanks to the invention, the length of the non-dosability zone can thus be markedly reduced.

This starting system also allows a better use of the characteristics of the clutch and the machine. This way, it is no longer necessary for the electrical machine to have a reserve torque in order to offset the torque withdrawn by the clutch. If required for an acceleration, the electrical machine can thus operate at its peak torque to power the drive of the vehicle, during the whole time when the heat engine is not available. In general, then, the electrical machine operates at its peak torque while the clutch remains disengaged. The fact that the electrical machine can operate at its peak torque makes it possible to markedly reduce the width of the non-dosability zone.

As a consequence, with the invention, it is no longer necessary to use sensors to detect the slope of the road. And it is no longer necessary to keep the engine on when the vehicle is on a slope or when it is overloaded.

Introducing the starting system also simplifies the control of the clutch and of the electrical machine during initiation of movement. The new architecture, then, makes it possible to bypass synchronizing the actions of the clutch with those of the electrical machine. In this new architecture, the problem of estimating the torque applied by the electrical machine to offset the breakaway torque is gone, since the clutch no longer participates directly in starting the engine.

Thus, the invention concerns a method for setting a vehicle in motion on an up slope and/or with a high load, characterized in that:

the vehicle being stopped or moving at low speed and the heat engine being stopped, a power transmission device comprising an electrical machine is implemented, this electrical machine being connected firstly to a heat engine of the vehicle via a clutch and secondly to a shaft of wheels of the vehicle, first, the electrical machine is powered on, and the heat engine is started by transmitting to it a breakaway torque using a starting system mechanically independent of the electrical machine.

The following description and accompanying figures will make the invention more easily understood. These figures are given as an illustration, and are in no way an exhaustive representation of the invention. These figures show.

Figure 4:
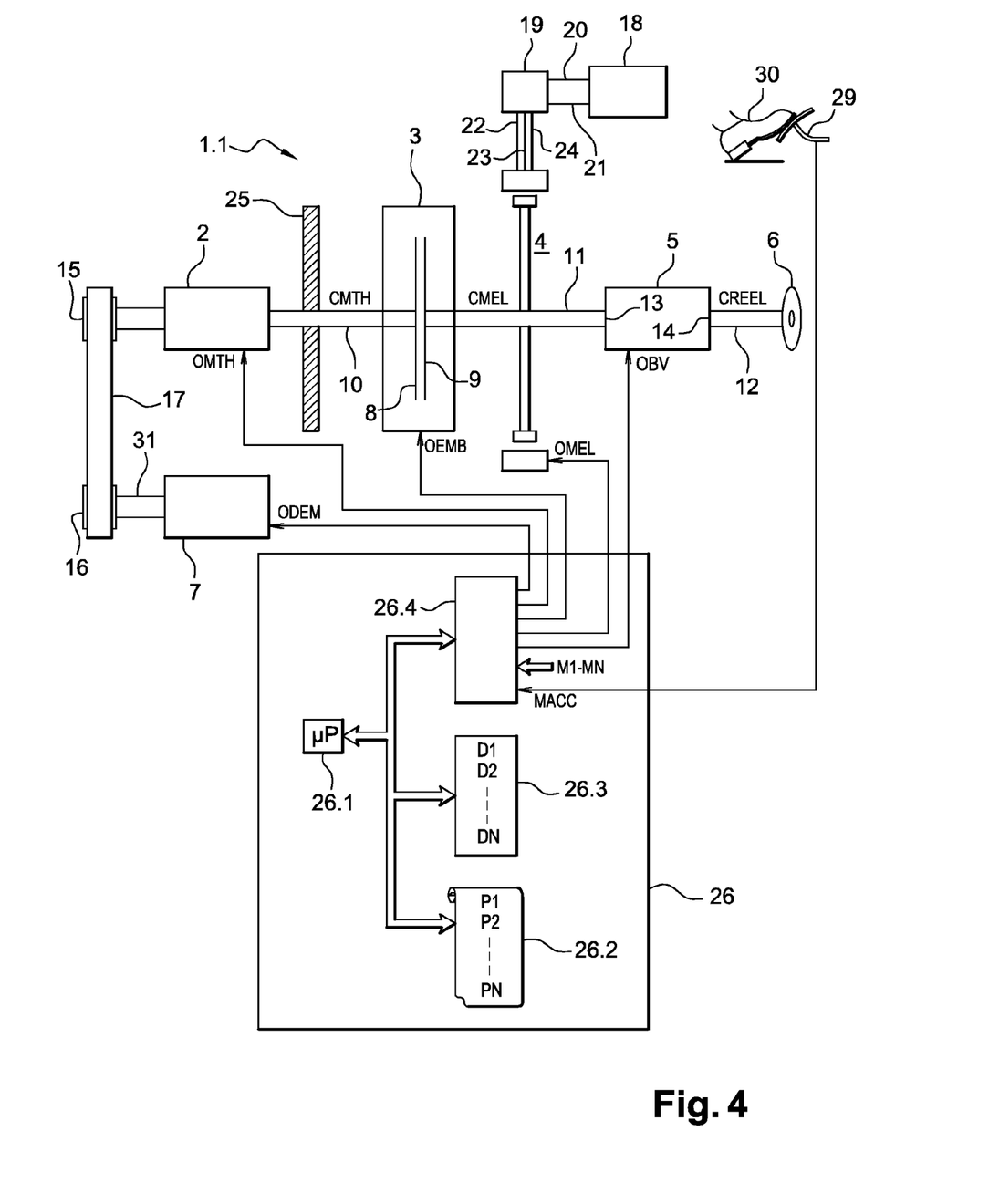
FIG. 4: a schematic representation of a transmission device according to the invention having a starting system.

FIG. 4 shows a schematic representation of a transmission device 1.1 according to the invention. Like the state of the art transmission device 1, this transmission device 1.1 has a heat engine 2, a clutch 3, an electrical machine 4, a speed control unit 5 and wheels 6. The four members 2-5 and the wheels 6 of the vehicle make up a traction drive, and are arranged in the same manner as in the state of the art transmission device 1. In addition, in accordance with the invention, the transmission device 1.1 has a starting system 7 connected to the heat engine 2.

This starting system 7 is connected to the heat engine 2 and sets it in rotation in order to start it. The starting system 7 is mechanically independent of the electrical machine 4. The starting system 7 thus starts the heat engine 2 without taking power from this traction drive. Consequently, starting the heat engine 2 no longer has any impact on the continuity of the torque applied to the shaft 12 of wheels 6.

The starting system 7 therefore never contributes power to the drive.

For this reason it is appropriately sized to generate just enough power to start the heat engine 2, which is significantly less power than that of the electrical machine 4, and which does not require a high input voltage.

In a particular embodiment, the heat engine 2 has a first pulley 15 attached to one end of its shaft 10. And the starting system 7 has a second pulley 16 attached to one end of its shaft 31. A belt 17 runs through a groove in each of these two pulleys 15 and 16 so as to connect the starting system 7 to the heat engine 2.

In the invention, the electrical machine 4 is always connected to a storage device 18, such as a battery. As a variant, the storage system 18 is an inertia machine or a supercondenser.

In a particular embodiment, the transmission device 1.1 can also have a flywheel 25. This flywheel 25 is connected to the shaft 10 of the heat engine 2, between this heat engine 2 and the clutch 3.

In addition, the transmission device 1.1 according to the invention also has the supervising computer 26. When one of the programs P1-PN is executed, the microprocessor 26.1 commands the interface 26.4 so that in addition to the signals OMTH, OEMB, OMEL, OBV, a signal ODEM is sent to the starting system 7 to control it. The signals OMTH and OMEL control the heat engine 2 and the electrical machine 4, respectively, so that this heat engine 2 always operates at its optimal operating point, where, for a given power level, it consumes a minimum of fuel. When a change in operating mode occurs, some of the programs P1-PN generate signals OMTH, OEMB, OMEL, OBV and ODEM making it possible to change from one mode to another.

The starting system 7 also has an internal control system that is not shown. This control system makes it possible to regulate the value of the breakaway torque that this starting system 7 applies to the shaft 10 of the heat engine 2.

The clutch 3 is a wet or dry plate clutch.

Figure 5:
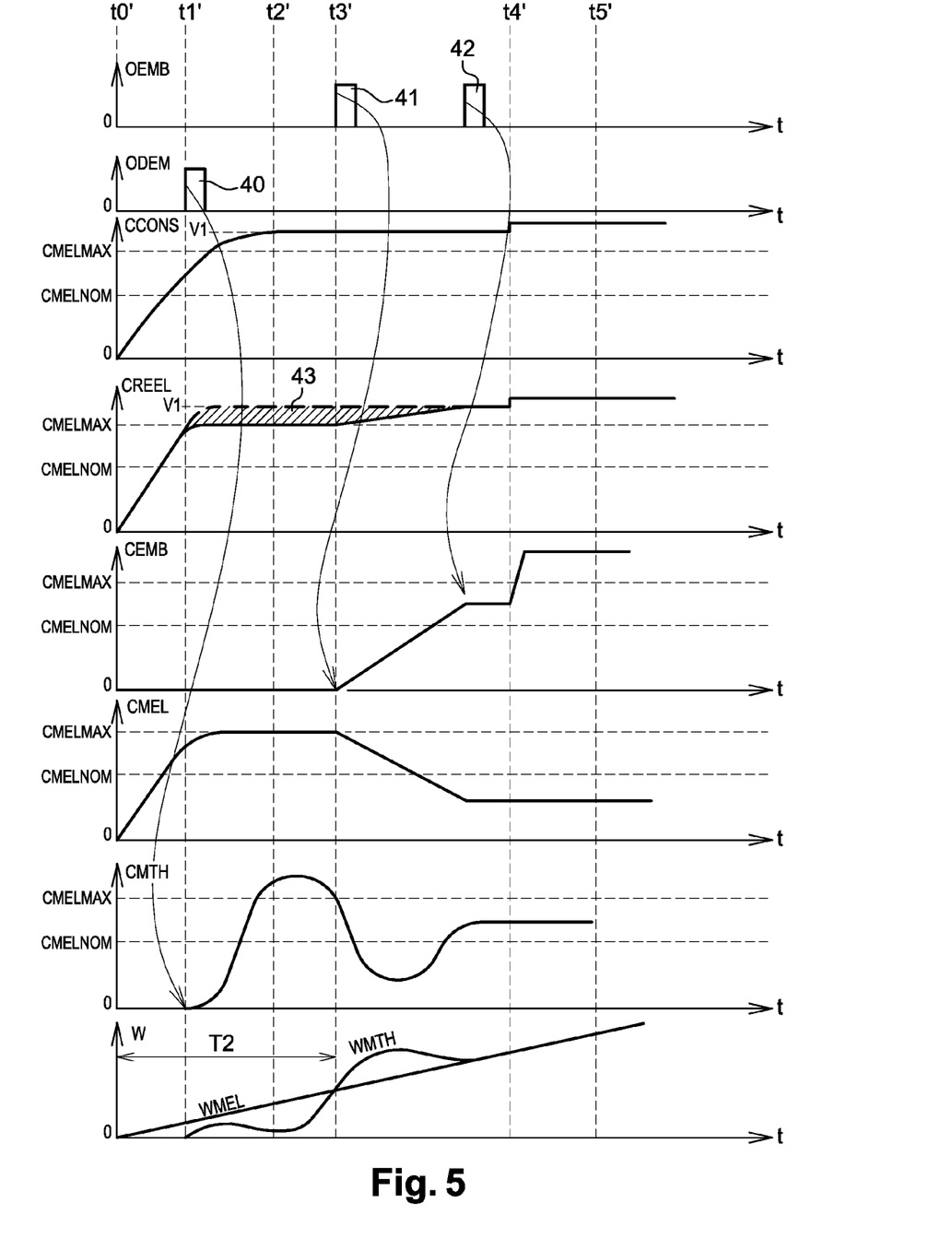
FIG. 5: timing diagrams representing the change over time in signals detectable on members of a transmission device according to the invention during initiation of movement on an up slope.

FIG. 5 shows some timing diagrams of signals detectable on the various members 2-5 of the transmission device 1.1 according to the invention. As in FIG. 2, these signals can be detected during initiation of movement of the vehicle on an up slope.

For more simplicity, only the signals OEMB and ODEM that play a major role in an initiation of movement on a slope are shown.

At instant t0', as previously, the vehicle is stopped on an up slope and an acceleration request is made by the driver. The electrical machine 4 and the heat engine 2 each have a rotation speed of zero. As a variant, the vehicle moves at very low speed and the electrical machine 4 has a low rotation speed WMEL.

Between instants t0' and t1', the transmission device 1.1 enters a first acceleration phase. In this first phase, the electrical machine alone provides power to the drive of the vehicle. More precisely, in this first phase, the setpoint torque CCONS increases such that, at instant t1', it is generally equal to the nominal torque CMELNOM of the electrical machine 4. Further, the electrical machine 4 is operated so that the torque signal CMEL of the electrical machine 4 follows the appearance of the torque signal CCONS. Contrary to the electrical machine 4 of the device 1, the electrical machine 4 is allowed to operate at its peak torque CMELMAX when the heat engine 2 is not available. The fact that the machine 4 can operate at its peak torque CMELMAX allows the torque CREEL to be equal to the requested setpoint torque CCONS. The heat engine 2 is stopped and its shaft 10 is not coupled to the shaft 11 of the electrical machine 4. The heat engine 2 thus has a torque CMTH of zero. In addition, the rotation speed of the heat engine 2 is zero while the rotation speed WMEL of the electrical machine 4 increase linearly.

Between instants t1' and t2', the transmission device 1.1 enters a second acceleration phase. An objective of this second phase is to start the heat engine 2. To this effect, at instant t1', at the end of the execution of the programs P1-PN by the computer 26, a signal 40 is sent to the starting system 7. This signal 40 is sent less than 300 ms after the acceleration request by the driver. This signal 40 commands the starting system 7 which supplies a breakaway torque to the heat engine 2 and drives it in rotation. A torque signal CMTH corresponding to the starting torque of this heat engine 2 is then detectable. The shaft 10 of the heat engine 2 is still not coupled with the shaft 11 of the electrical machine 4, so that the latter alone still powers the drive of the vehicle. Further, the setpoint torque CCONS is still increasing exponentially, so that at instant t2', it has already reached a value V1 greater than the peak torque CMELMAX of the electrical machine 4. The torque CMEL of the electrical machine 4, for its part, remains at the value of the peak torque CEMELMAX of this machine 4. Thus, the torque CREEL measured on the shaft 12 of the wheels 6 is slightly lower than the setpoint torque CCONS. The heat engine 2 then has a rotation speed WMTH which is lower than that of the electrical machine 4. The heat engine 2 performs its first compressions, 4 or 5 in one example, so as to reach a speed sufficient to be autonomous. As soon as the heat engine 2 is autonomous, the computer 26 sends a signal to the starting system 7, so as to cut off this starting system 7, i.e., to stop it.

Between instants t2' and t3', the transmission device 1.1 enters a third acceleration phase. In this third phase, the rotation speed of the heat engine 2 increases. More specifically, in this third phase, the electrical machine 4 still operates at its peak torque CMELMAX, while the setpoint torque CCONS still has the value V1. Since the shaft 11 of the machine 4 and the shaft 10 of the engine 2 are not coupled, the torque signal CREEL is identical to the torque signal CMEL. The rotation speed WMTH of this heat engine 2 increases so that at instant t3' it is higher than the rotation speed WMEL of the electrical machine 4. The rotation speed WMEL of the electrical machine 4 still increases linearly. No torque CEMB is detectable on the clutch 3. An objective of this third phase is to increase the rotation speed of the heat engine 2 to make it possible, as will be seen below, to make the plates 8 and 9 of the clutch 3 start sliding with respect to one another.

Between instants t3' and t4', the transmission device 1.1 enters a fourth acceleration phase. In this fourth phase, first, a synchronization of the heat engine 2 occurs, then the clutch 3 engages. More precisely, first, at instant t3', a signal 41 is sent to the clutch 3. This signal 41, like before the signal 33, commands the plates 8 and 9 to start sliding with respect to one another. The heat engine 2 then transmits part of its torque CMTH to the shaft 12 of the wheels 6 via the clutch 3. The torque detectable on the clutch 3 thus increases in a calibratable manner, since this clutch 3 transmits a torque to the power drive. The torque signal CMEL of the electrical machine 4 then decreases, if the setpoint torque CCONS can be complied with. Generally, when the clutch 3 is engaged, the electrical machine 4 is operated at a torque lower than its peak torque CMELMAX as soon as a setpoint torque CCONS can be complied with, so as not to consume electrical power from the battery uselessly. In the case where the setpoint torque CCONS cannot be reached, the electrical machine always operates at its torque CMELMAX after the clutch 3 engages. Further, during the synchronization of the heat engine 2, the rotation speed WMTH of the heat engine 2 converges toward that WMEL of the electrical machine 4. When these two speeds are substantially equal, a signal 42 is sent to the clutch 3 to command it to engage. In practice, the signal 42 is sent when the absolute value of the difference between the rotation speed WMTH of the heat engine 2 and the rotation speed WMEL of the electrical machine 4 is lower than a value between 0 and 15% of the rotation speed WMEL of the machine 4. The rotation speeds of the heat engine WMTH and of the electrical machine WMEL thus become identical.

Between instants t4' and t5', the transmission device 1.1 enters a fifth acceleration phase. In this fifth phase, the setpoint torque signal CCONS increases in a calibratable manner. In the example shown, CCONS increases stepwise. As before, in this fifth phase, the power members 2 and 4 converge toward their optimal setpoint value with respect to the consumption of the heat engine 2, if they have not yet reached it. More precisely, the torque CMTH of the heat engine 2 evolves in such a way that a measurement of this torque reaches a first setpoint torque signal. The torque CMEL of the electrical machine (4) evolves in such a way that a measurement of this torque reaches a second setpoint torque. These two setpoint torque signals are optimal in terms of the fuel consumption of the heat engine 2.

Further, the clutch torque signal CEMB increases to become higher than the engine 2 torque signal CMTH. The torque signal CREEL thus follows the evolution of the setpoint torque signal CCONS.

Thus, when the heat engine 2 is started, the clutch 3 is disengaged and remains disengaged during a predetermined time period which lasts between t0' and t3'. This time period can be a function of the setpoint torque CCONS requested by the driver and/or of the time needed by the heat engine 2 to become autonomous. As a variant, the clutch 3 is already engaged when the heat engine 2 is started. In this variant, the starting system 7 and the electrical machine 4 both contribute to the transmission of the breakaway torque CARR to the heat engine 2. In an example, the starting system 7 is connected to the heat engine 2 via a first reducer assembly that has a lower ratio than that of a second reducer assembly, through which the electrical machine 4 and the heat engine 2 are connected, so that the torque applied to the shaft 10 of the heat engine 2 by the starting system 7 is higher than the torque applied to this shaft 10 by the electrical machine.

As a variant, startup of the heat engine 2 is commanded as soon as instant t0. That is, in this variant, the signal 40 is sent as soon as instant t0'.

As on FIG. 2, the setpoint torque signal CCONS has also been shown on the timing diagram of the torque signal CREEL. The shaded area 43 represents the non-dosability zone 43 of the torque applied to the shaft 12 of the wheels 6 for the device 1.1 according to the invention. This zone 43 has a surface area much smaller than that of the zone 35.

That is, the zone 43 is much narrower in the direction of the ordinates than the zone 35 because, in the invention, the electrical machine 4 is allowed to operate at its peak torque CMELMAX, as long as the heat engine 2 is not available. That is, the electrical machine 4 does not need in this case to compensate the breakaway torque of the heat engine 2, since this breakaway torque is applied by the starting system 7 which is independent of the electrical machine 4. As a consequence, during the whole duration of initiation of movement of the vehicle on an up slope, the torque signal CREEL is very close to the setpoint torque signal CCONS requested by the driver.

In addition, the zone 45 is much shorter in the direction of the abscissa than the zone 35 because, in the invention, the torque of the heat engine 2 can be made available very quickly. Thus, the time T2 for making the heat engine available with the device 1.1 is much shorter than the time T1 for making the heat engine 2 available with the device 1. This is because, with the invention, it is no longer necessary to wait until the electrical machine 4 has reached a specific speed to start the heat engine 2.

In addition, in the invention, during the transmission of the breakaway torque by the starting system 7, the actions applied to the clutch 3 by the heat engine 2 and the electrical machine 4 are applied independently from one another. An action by the heat engine 2 is an action by the starting system 7 which is that of starting the heat engine 2. As a result, the invention can also be implemented with transmission devices 1.1 having non-mechanical clutches 3.

With the method of the invention, the initiation of movement is more robust than with a state of the art method. That is, the starting system 7 can start the heat engine with a constant torque, regardless of the driving conditions of the vehicle.

As a consequence, thanks to the invention, the vehicle can respond to critical acceleration requests on an up slope or with a high load when the heat engine 2 is stopped, while ensuring the security of the driver.

The invention claimed is:

1. Method for fast setting in motion of a vehicle on an up slope and/or with a high load, said vehicle comprising a power transmission device comprising an electrical machine connected firstly to a heat engine via a clutch and secondly to a shaft of wheels, and a starting system connected to this heat engine and mechanically independent of the electrical machine,
wherein said method comprises:
increasing a torque of the electrical machine at a time when (i) the vehicle is stopped or moving at low speed, (ii) the heat engine is stopped, and (iii) a driver of the vehicle requests an acceleration,
starting the heat engine by transmitting to this heat engine a breakaway torque, using the starting system connected to this heat engine and mechanically independent of the electrical machine, and
once the heat engine has been started, allowing the heat engine to run through its first compressions in order to be autonomous, then cutting off the starting system.

2. Method according to claim 1, further comprising:
during startup of the heat engine, releasing the clutch and leaving the clutch disengaged during a predetermined time.

3. Method according to claim 2, further comprising:
operating the electrical machine at its peak torque as long as the clutch remains disengaged.

4. Method according to claim 2, further comprising:
after the electrical machine has been powered on and the heat engine has been started, increasing a rotation speed of the heat engine until this rotation speed becomes higher than a rotation speed of a shaft of the electrical machine which corresponds to the speed of the wheel shaft.

5. Method according to claim 2, further comprising:
after the electrical machine has been powered on and the heat engine has been started, making plates of the clutch start sliding with respect to one another, one of the plates of this clutch being connected to a shaft of the heat engine, another plate of this clutch being connected to a shaft of the electrical machine.

6. Method according to claim 5, further comprising:
making a rotation speed of the heat engine converge toward a rotation speed of the electrical machine, and
engaging the clutch when the rotation speed of the heat engine is substantially equal to the rotation speed of the electrical machine.

7. Method according to claim 1, further comprising:
during an acceleration of the vehicle subsequent to this initiation of movement, the clutch being engaged, operating the electrical machine either at its peak torque or at a lower torque if a setpoint torque can be complied with.

8. Method according to claim 1, further comprising:
engaging the clutch, and
making a torque of the heat engine evolve such that a measurement of this torque reaches a first setpoint torque signal,
making a torque of the electrical machine evolve such that a measurement of this torque reaches a second setpoint torque signal,
these setpoint torque signals being optimal with respect to the fuel consumption of the engine.

* * * * *